United States Patent [19]
Antoine et al.

[11] 3,862,574
[45] Jan. 28, 1975

[54] ADJUSTING THE TEMPERATURE OF A RADIATION FURNACE

[75] Inventors: Jacques Antoine, Longeville-les-Metz; Jean-Jacques Mathieu, Saint Julien-les-Metz, both of France

[73] Assignee: Institut de Recherches de la Siderurgie Francaise, Saint-Germain-en-Laye, France

[22] Filed: Feb. 28, 1973

[21] Appl. No.: 336,874

[30] Foreign Application Priority Data
Mar. 6, 1972 France .............................. 72.07638
Mar. 16, 1972 France .............................. 72.09168

[52] U.S. Cl. ................. 73/343 R, 73/359, 136/231
[51] Int. Cl. ............................................. G01k 1/08
[58] Field of Search........... 73/359, 343 R; 136/231, 136/233

[56] References Cited
UNITED STATES PATENTS
2,576,514  11/1951  Bianco .................................. 73/359
3,069,752  12/1962  Sherning ............................ 136/233
3,301,715  1/1967  Gerrard ............................. 136/233

OTHER PUBLICATIONS
Institute of Fuel, Spalding et al., March 1939, page 5105.
Pyrometry by Thermocouples, 1940, page 35.

Primary Examiner—Richard C. Queisser
Assistant Examiner—Denis E. Corr

[57] ABSTRACT

A temperature measuring device for insertion in a furnace wall has a sheath adapted to be inserted in the furnace wall and a refractory thermal conductor within the end of the sheath at the end thereof toward the inside of the furnace. A thermocouple device is provided in an aperture in the refractory thermal conductor. The device may be provided with cooling conduits to cool the end of the thermal conductor within the sheath, and rods extending through the sheath and thermal conductor and movable longitudinally therein to enable removal of incrustations formed on said refractory thermal conductor.

6 Claims, 4 Drawing Figures

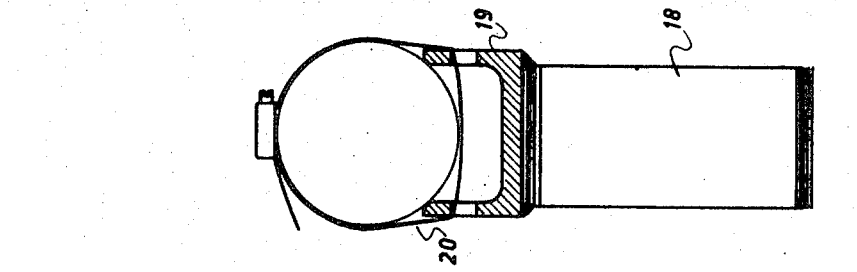
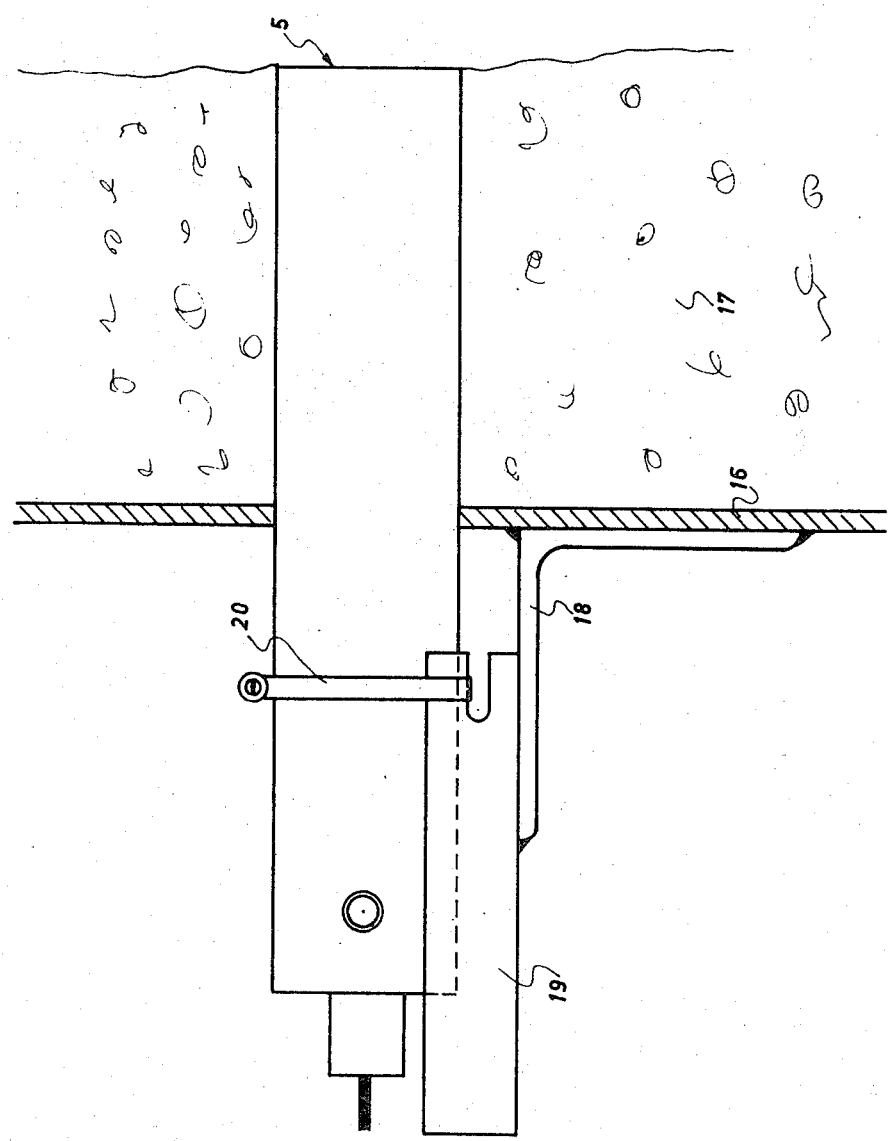

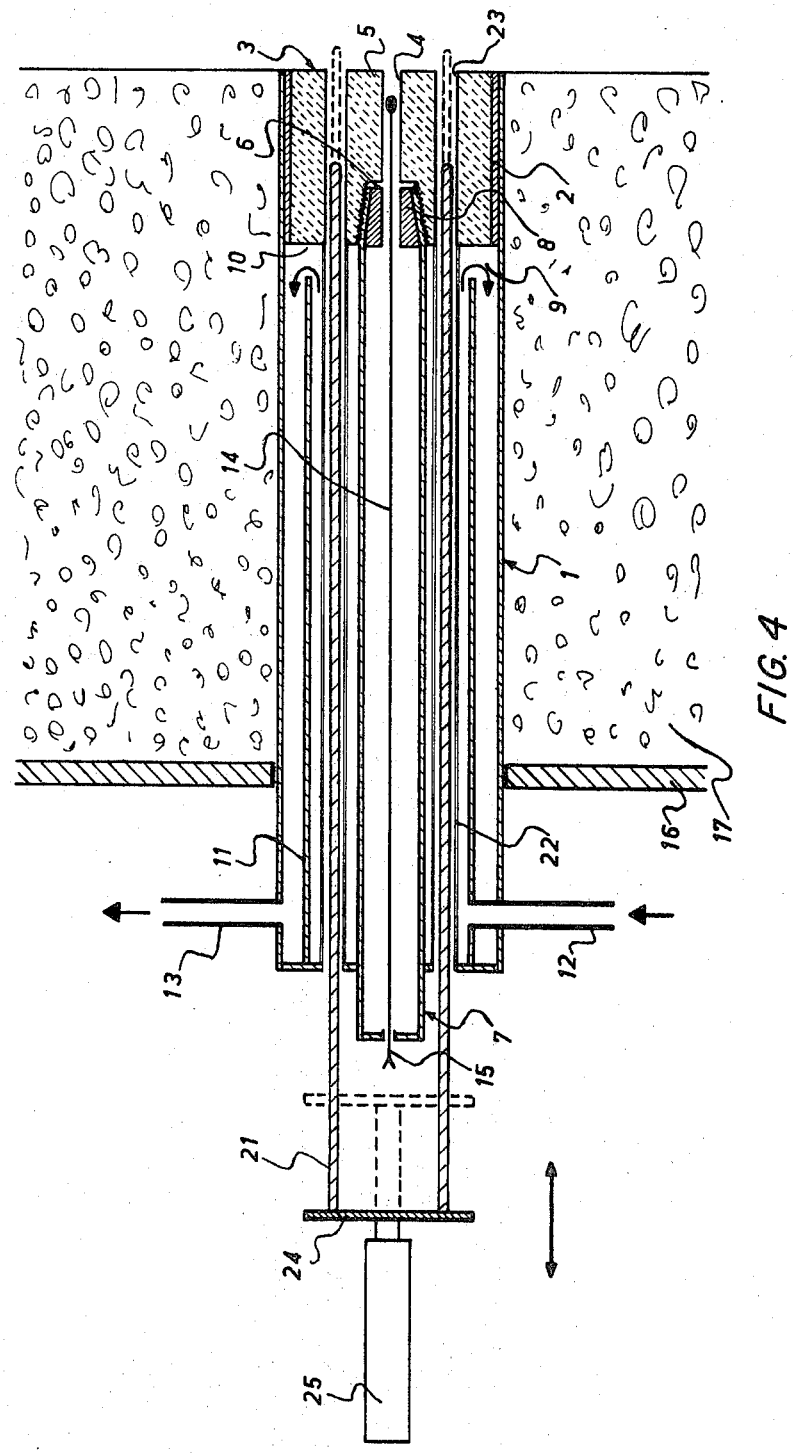

ADJUSTING THE TEMPERATURE OF A RADIATION FURNACE

The present invention relates to a device for measuring the temperature in a furnace.

The invention relates to a device for measuring temperature, the device comprising a barrel made of a refractory and thermally conductive material, for example, graphite, through which there is a passage wherein there is situated a thermocouple, the thermocouple barrel being cooled at one end by water circulating at a constant rate of flow within an annulus surrounding said end.

Such a device may be arranged within a wall of a furnace, particularly an arc furnace, in such a manner that the weld or welded joint of the thermocouple is located in a recess in the internal surface of the furnace with the cooled end of the barrel projecting beyond the external surface of the furnace. The position of the thermocouple within the passage may be adjusted as the furnace lining undergoes wear, the barrel itself undergoing wear at substantially the same speed as the lining surrounding it.

The thermocouple renders it possible to measure the temperature changes of the barrel, of which a portion is exposed to the radiation of the furnace at the point in question. In view of the high thermal conductivity of the barrel, the temperature changes detected by the thermocouple represent radiation changes, thus rendering it possible to follow the progress of the actions produced within the furnace as they occur, for example during the fusion of solid charges.

While such devices are evidently positioned above the molten metal present in the furnace, they cannot however be situated at an excessive height if the temperature measured is intended to convey a true picture of the thermal condition of the furnace. It is well known however that the medium is not always calm in these furnaces, and in especially in arc furnaces employed for metal smelting and refining. The occurence of many metal splashing actions and the formation of an atmosphere charged with metal vapours and dusts have been observed. Clinging patches are thus seen to be formed locally on the walls of the furnace, which may obviously and equally cover the sensing surface of the temperature devices in question. It is quite obvious that any measurement provided by a device thus coated becomes meaningless, and an inopportune operation preset for such a condition by an automatic control system may be triggered off. Accordingly, it will be understood that it is essential for the detection devices to be constantly maintained in operational condition to allow reliable and satisfactory automatic control.

According to the invention, a device for measuring the temperature in a furnace is provided, comprising: a tubular sheath; a refractory thermal conductor arranged within an end portion of the sheath and having a portion facing out of the sheath for exposure to radiation from within the furnace; means for determining temperature arranged within the refractory thermal conductor; and means for cooling the refractory thermal conductor, said means being arranged within the sheath.

A preferably tube is provided within an annular space between the sheath and the sleeve, one end of the said tube being situated adjacent a portion of the refractory thermal conductor remote from said portion facing out of the sheath. The space between the tube and the sleeve being in communication with a source of cooling fluid through a feed pipe, the space between the said tube and the sheath being in communication with the outside through a duct for discharge of said fluid.

The term "refractory thermal conductor" is understood to refer to an element made of a material which is refractory and also thermally conductive.

The device according to the invention makes it possible to effect a substantial reduction in the temperature of the refractory thermal conductor exposed to thermal radiation by providing a strong cooling action on one surface of the conductor close to the surface exposed to radiation. A temperature detection element operating at considerably lower temperatures than the temperatures to which the barrel would be raised in the absence of a cooling action of this kind, may consequently be employed to measure the temperature of the conductor and the changes of the temperature.

The device may comprise withdrawable units which may be displaced in a direction at right angles to the wall of the furnace and may project at the surface of the thermal conductor positioned towards the inside of the furnace. These withdrawable units may consist of rods arranged in longitudinal passages formed in the tubular sheath and in the thermal conductor. To make provision for the displacement of the rods, these may be firmly coupled at their ends external to the furnace, to mechanical means for imparting thereto a longitudinal displacement of sufficient magnitude for their opposite extremity to be projected beyond the surface of the thermal conductor.

Two devices embodying the invention are described below with reference to the accompanying drawings, wherein:

FIG. 2 is a front view of the device shown in FIG. 1, the device being inserted in a furnace wall;

FIG. 3 is a side view of the device shown in FIG. 1; and

FIG. 4 is a longitudinal section of the other device.

Figure 1:
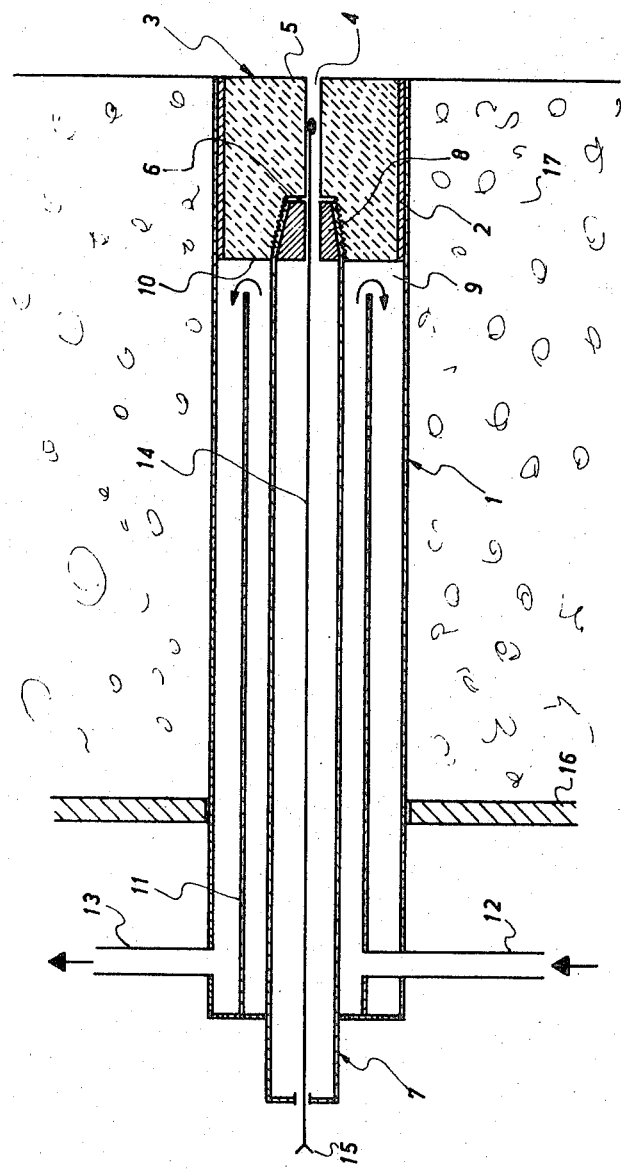
FIG. 1 is a diagrammatic longitudinal section of one device.

The device shown in FIG. 1 comprises a tubular metal sheath 1. The sheath 1 is closed at one end and open at the other end. The sheath 1 is reinforced adjacent its open end by an annulus 2 located internally of the sheath 1. A graphite element 3 having an axial passage 4 is positioned within the annulus 2. Graphite is both refractory and a satisfactory thermal conductor. An outer end surface 5 of the element 3 and the open end of the sheath 1 are disposed in a common plane. The sheath 1 is implanted in a wall of a furnace. The graphite element 3 has a thickness substantially smaller than the thickness of the furnace wall in the region where the tubular sheath is implanted. The end of the passage 4 opening into the external surface 5 may be sealed by a protective graphite plug (not shown). The passage 4 opens, in the side thereof towards the inside of the sheath, into a conical or tapered recess 6. A tubular metal sleeve 7 is positioned coaxially within the sheath along the axis of the latter. The sleeve 7 has a tapered end portion having a taper corresponding to the taper of the recess 6. The end portion of the sleeve 7 is inserted into the recess 6. The tapered end portion of the sleeve 7 is reinforced by a metal component 8 which has an axial bore and which is inserted into the said sleeve. The opposite end of the sleeve is firmly joined to the closed end of the sheath 1. An annular space 9 extending between an internal end surface 10 of the graphite element 3 and the closed end of the sheath 1 is thus formed between the sheath 1 and the sleeve 7. An intermediate tube 11 is positioned coaxially with the sleeve 7 within the space 9. One end of the tube 11 is situated adjacent but spaced from the internal end surface 10 of the graphite element 3. A space between the sleeve 7 and the tube 11 is in communication with a constant flow source of water (not shown) through a feed pipe 12. The space between the sheath 1 and the tube 11 is in communication with the outside through a drain pipe 13. A "Chromel-Alumel" thermocouple is arranged within the sleeve 7 and within the axial passage of the graphite element 3. The sensing extremity of the thermocouple is situated within the passage of the graphite element 3. The thermocouple is connected to external measurement or control instrumentation (not shown) through connecting wires 15.

The device is inserted in an orifice formed in the armoring 16 and lining 17 (see FIG. 2) of the wall of a furnace, the external end surface 5 of the graphite element 3 lying in the plane of the internal surface of the lining and that the sheath 1 projecting outside the armoring. The device is axially displaceable in the orifice and its projecting portion is supported by a bracket 18 rigidly connected to the armoring of the furnace and provided and an end having a U-section 19 forming a slide. The device may be fixed in any desired position by a clip 20 of a type known per se.

The operation of the device shown in FIGS. 1 to 3 is described below.

The graphite element 3 has its external end surface 5 exposed to the radiation of the furnace in the area of the furnace wall where the device is implanted. Cooling water flows at a constant rate through the sheath 1, the water entering through the pipe 12 and being discharged through the pipe 13. The graphite element is thus cooled through its internal end surface 10. The rate of flow of the cooling water being constant, temperature changes detected by the thermocouple 14 represent the changes in radiation in the area of the furnace wall where the device is inserted. Recording these changes renders it possible to deduce therefrom control parameters for operation of the furnace.

In view of the low thermal inertia inherent in the graphite element 3, the graphite may be maintained permanently at relatively low temperatures, considering the intensity of radiation affecting the external surface 5 of the graphite element 3. The applicant has observed that it was possible to keep the temperature of the graphite close to 700°C for a wall temperature of approximately 1,500°C in the area of the furnace wall where the device was inserted. Thus, oxidation of the graphite by the combined action of the furnace atmosphere and temperature is prevented. The use of conventional thermocouples of the "chromel-alumel" type, having a considerably lower price than that of thermocouples resistant to high temperatures such as platinum-rhodium-plated platinum thermocouples, is possible thus providing a substantial cost savings.

Since the device is axially displaceable within an orifice of the furnace wall, the position of the sheath in the orifice may be adjusted as the lining wears, the external surface 5 of the graphite element 3 remaining substantially in the plane of the surface of the lining surrounding the same. The sheath 1 is supported externally of the armouring by means of the slide 19 and may be held temporarily in any desired position.

The device shown in FIG. 4 is similar to that shown in FIGS. 1 to 3 and like reference numerals denote like parts. The device shown in FIG. 4 includes push rods 21. The tubular metal sheath 1 is provided with internal tubes 22 extending therethrough and the element 3 has passages 23 extending therethrough. Normally, the pushrods 21 occupy a position in which they are withdrawn into the graphite element 3 and are thus protected against the direct radiation of the furnace. The extremities of these push-rods situated externally to the furnace are firmly joined to a frame 24 which is mechanically linked to the piston of a double-acting jack 25. Under the action of the jack 25 the push-rods are displaced in the passage 23 and caused to project beyond the surface 5 of the conductive unit 3 as shown by broken lines. It will be understood that if an incrustation is formed on the wall of the furnace and covers the sensing surface of the element 3, it may be pushed back and broken by the push-rods, thereby freeing the surface of the element 3 and enabling the device to provide a correct measurement again. It is quite obvious that this operation may be performed either when the formation of an incrustation has been detected or intermittently to prevent the forming of an incrustation.

The device may be used for determining the changes in radiation in a particular area of the wall of a furnace, for example an arc furnace. By judicious location of a plurality of devices according to the invention within the wall of an arc furnace, it is possible to establish control parameters for the operation of the furnace, for example during melting processes on pre-reduced products or scrap iron, and during refining processes when these products are being converted into steel.

We claim:

1. In a device for measuring the temperature of a furnace, wherein said device is of the type having an outer sheath, a thermally conductive element fixedly mounted in one end of the sheath and having a surface facing out of the sheath for exposure to radiation within the furnace, means for determining temperature positioned within said thermally conductive element, and means in said sheath for cooling said thermally conductive element; the improvement wherein said thermally conductive element is a refractory material mounted in a fixed position in said sheath, and further comprising elongated means extending through said sheath and said conductive element and longitudinally movable therein with respect to the sheath and thermally conductive element between a position fully within the sheath and a position extending outwardly beyond said surface of said thermally conductive element for dislodging the incrustations formed on said surface.

2. In a device for measuring the temperature of a furnace, wherein said device is of the type having an outer sheath, a thermally conductive element fixedly mounted in one end of the sheath, having a surface facing out of the sheath for exposure to radiation within the furnace, means for determining temperature positioned within said thermally conductive element, and means in said sheath for cooling said thermally conductive element; the improvement wherein said thermally conductive element is a refractory material mounted in a fixed position in said sheath, and further comprising a sleeve extending axially within said sheath from the other end thereof to said thermally conductive element, said means for determining temperature having leads extending through said sheath, whereby a longitudinally extending space is formed between said sheath and sleeve, said thermally conductive element having longitudinally extending internal passages aligned with said space, and elongated means extending through said space and passages and longitudinally movable therein with respect to said sheath and said thermally conductive element between a position fully within said sheath and a position extending through said passages outwardly beyond said surface of said thermally conductive element for dislodging incrustations formed on said surface.

3. The device of claim 2 wherein said elongated means are comprised of rods.

4. The device of claim 3 further comprising common mechanical means connected to the ends of said rods remote from said thermally conductive element, whereby said rods are moveable in common through said passages and beyond said surface.

5. The device of claim 2 wherein said means for determining temperature comprises a thermocouple.

6. In a device for measuring the temperature of a furnace, where said device is of the type having an outer sheath, a thermally conductive element fixedly mounted in one end of the sheath, having a surface facing out of the sheath for exposure to radiation within the furnace, means for determining temperature positioned within said thermally conductive element, and means in said sheath for cooling said thermally conductive element; the improvement wherein said thermally conductive element is a refractory material, further comprising a sleeve extending axially within said sheath from the other end thereof to said thermally conductive element, said means for determining temperature having leads extending through said sheath, whereby a longitudinally extending space is formed between said sheath and sleeve, said thermally conductive element having longitudinally extending passages aligned with said space, a plurality of tubes extending longitudinally through said space and aligned with said passages, a plurality of rods extending through said tubes and positioned to move longitudinally in said tubes with respect to said sheath and said thermally conductive element between a position fully within said sheath and a position extending through said passages outwardly beyond said surface of said thermally conductive element for dislodging incrustations formed on said surface, and mechanical means connected to the ends of said rods remote from said thermally conductive element, whereby said rods are movable in common through said passages and beyond said surface.

\* \* \* \* \*